Oct. 19, 1948.

R. C. DEHMEL 2,451,927

AUTOMATIC MAGNETIC APPARATUS FOR
SIMULATING RADIO RANGE SIGNALS

Filed April 10, 1946

INVENTOR.
Richard Carl Dehmel
BY
ATTORNEY

Oct. 19, 1948.
R. C. DEHMEL
2,451,927
AUTOMATIC MAGNETIC APPARATUS FOR
SIMULATING RADIO RANGE SIGNALS
Filed April 10, 1946
2 Sheets-Sheet 2
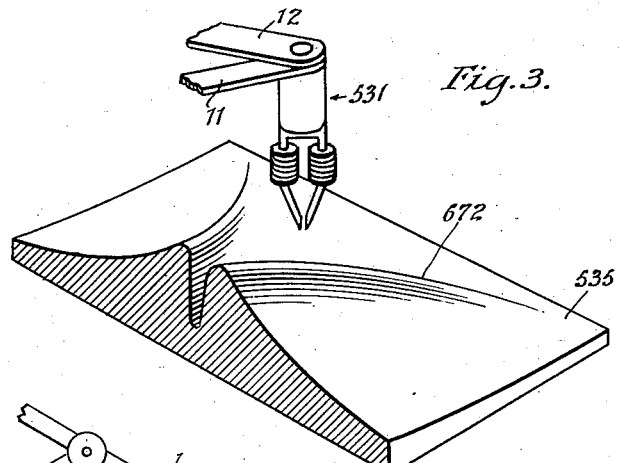
Fig.3.
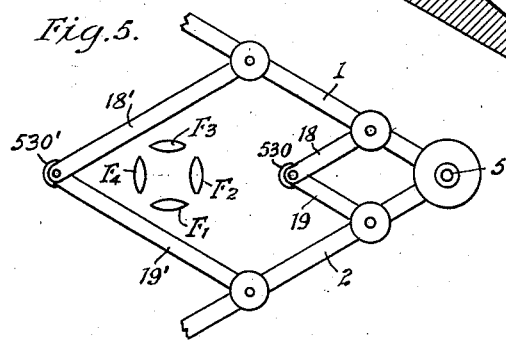
Fig.5.
Fig.4.
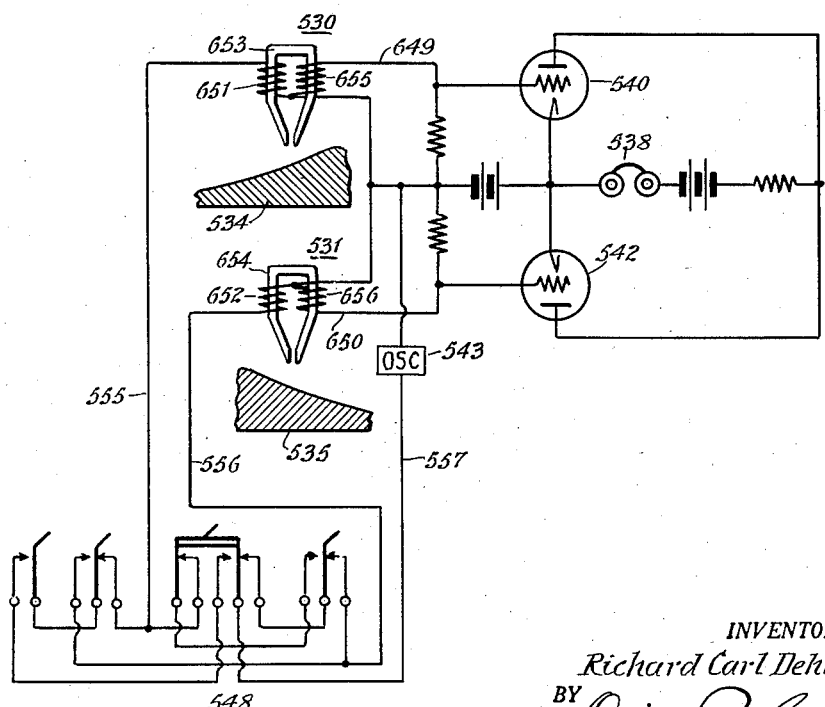
INVENTOR.
Richard Carl Dehmel
BY
ATTORNEY Patented Oct. 19, 1948

2,451,927

UNITED STATES PATENT OFFICE 2,451,927

AUTOMATIC MAGNETIC APPARATUS FOR SIMULATING RADIO RANGE SIGNALS

Richard Carl Dehmel, Summit, N. J.

Application April 10, 1946, Serial No. 660,908

5 Claims. (Cl. 35—10)

My invention relates to apparatus for use with aviation training devices and particularly to means whereby signals adapted to represent those of an airway radio range system may be automatically varied in accordance with the course of the simulated flight of the trainer.

In one well-known type of trainer, standard aircraft instruments are operated pneumatically and the radio signals are varied manually by an attending instructor who observes the movement of a three-wheeled traveling flight path recorder and attenuates the signals to represent those received by a pilot actually flying the course being simulated by the student.

In my United States Patent No. 2,366,603 granted January 2, 1945 for Aircraft training apparatus, I have described another type of aircraft trainer utilizing a pantographic flight course charting device.

It is the object of the present invention to provide means whereby the simulated airway radio range signals of an aviation trainer are automatically regulated by moving an attenuating device for the signals with respect to a modulating surface having a parameter varying according to the field strength distribution of the airway signals, the motion between the attenuating device and the surface being a scanning movement controlled by the travel of the aircraft position indicating element of the trainer.

It is a feature of my present invention that the signals may be controlled by scanning apparatus responsive to variations in the permeance of a magnetic circuit.

It is another feature of my invention that signals adapted to represent those from several radio transmitters or radio channels, such as the quadrature "A" and "N" or "E" and "T" signals of an airway, may each be separately controlled by a scanning device and combined in a common receiver circuit for the student.

Another feature of my invention resides in the provision of facilities for automatically operating audible or visual fan and station marker signals by means of a scanning device operated over a modulating surface by the movement of the aircraft position indicating element of the trainer.

These and many other features of the invention, such as novel means for introducing the effects of wind drift and rotating the scanned elements to change the direction of wind drift will be more clearly understood by reference to the following text and the drawing in which practical commercial embodiments of the invention are shown. It is to be clear, of course, that such illustrations are primarily for purposes of disclosure and that the structures may be modified in various respects without departure from the broad spirit and scope of the invention hereinafter defined and claimed.

This application is a continuation-in-part of my abandoned application Serial No. 501,009 filed September 2, 1943 for Automatic signal controlling apparatus for aircraft training devices, which is in turn a division of the application Serial No. 423,824, filed December 20, 1941, that matured into my above referred to Patent No. 2,366,603.

Parts in the specification and drawing will be identified by specific names for convenience, but these are intended to be as generic in their application to similar parts as the art will permit.

Like reference characters denote like parts in the several figures in the drawing of which:

Fig. 3 is a perspective sectional view of a magnetic signal controlling element;

Fig. 4 is a partly diagrammatic view of a control and amplifying circuit used in the present invention; and Fig. 5 is a fragmentary view of a pantograph structure carrying a supplementary coil for fan marker signals.

Figure 1:
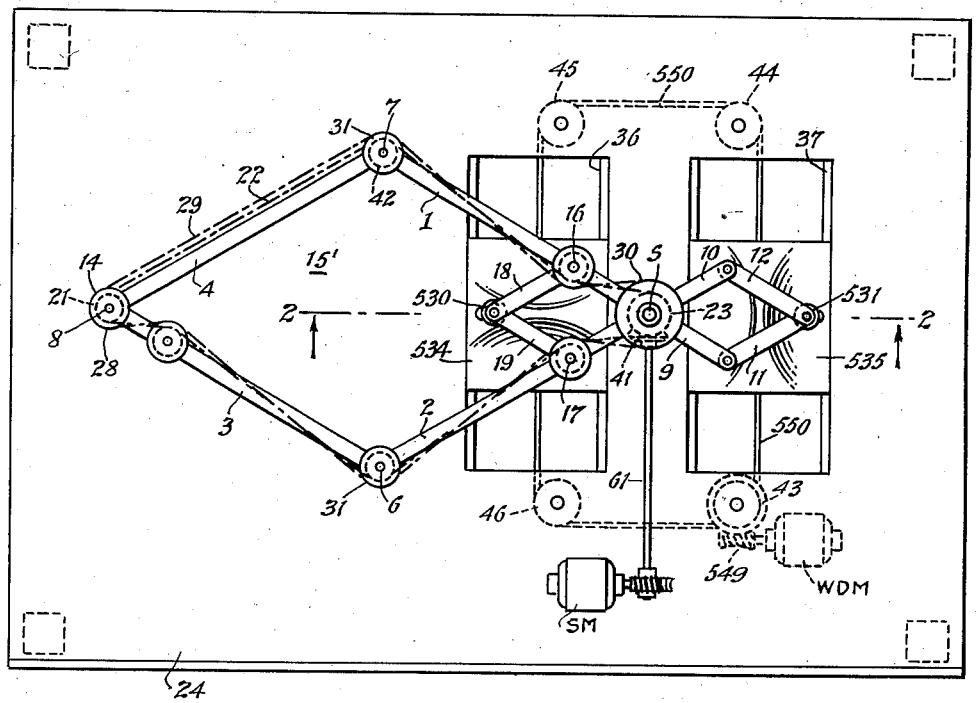
Fig. 1 is a plan view of the flight course charting device and traversing table of an aircraft trainer modified to embody the present invention.

The application of the invention is not to be limited to any particular type of trainer as it can be adapted to use with electrically, fluid, or mechanically operated training systems and with a variety of flight-indicating or recording devices. For convenience, one form of the invention will be described wherein it is adapted to a trainer of the type disclosed in my copending application referred to above. The flight path indicator of this trainer is illustrated in Fig. 1 as being of the pantograph type. The main pantograph 15' comprises four arms, 1, 2, 3, and 4, pivoted together at their junctions by pivots 5, 6, 7 and 8. The arms 1 and 2 have short extensions, 9 and 10, to the ends of which pantograph arms 11 and 12 are pivoted, the latter arms being pivoted together at their junction by a scanning element 531, more fully disclosed in the following text. Also pivoted to the arms 1 and 2 by pivots 16 and 17 are two additional pantograph arms 18 and 19 at the junction point of which is a scanning element 530.

Figure 2:
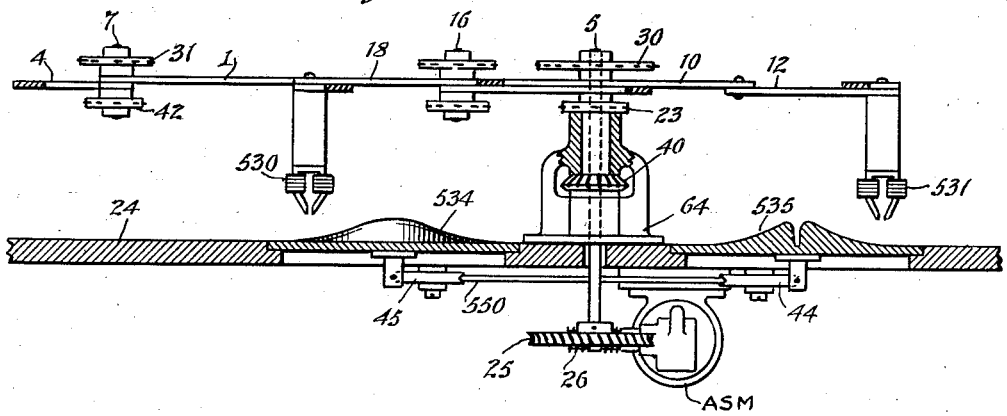
Fig. 2 is a sectional view on line 2—2 of Fig. 1 and shows the apparatus adapted to a magnetic method of signal controlling.

At the junction point 8 is located a driving head 14 which has a tractor wheel (not shown) driven by a sprocket wheel 21, Fig. 1, and through the sprocket chain 22, Fig. 1, by the driving sprocket wheel 23, Figs. 1 and 2, which is secured to the upper end of the pivot shaft 5, Fig. 2. This shaft is mounted for rotation in a bearing secured to the table 24 and is driven by worm gear 25, in turn driven by the worm 26 mounted on the shaft of the motor ASM, which rotates under control of the trainer circuits at a speed corresponding to the speed of the simulated flight. To guide the chain 22, Fig. 1, idler pulleys 31, Figs. 1 and 2, are rotatably mounted on the pivots 6 and 7 of the pantograph.

The tractor wheel, referred to above, is mounted in a longitudinally disposed axle rotatably supported in the lower end of the driving head 14 which is itself rotatable about the vertical axis to orient said wheel in response to the operation of the trainer in the simulation of steering. To rotate the driving head 14, Fig. 1, sprocket wheel 28 is attached thereto and is driven by a sprocket chain 29, driven by a driving sprocket 30, Figs. 1 and 2. Sprocket 30 is mounted to rotate freely with respect to the pivot shaft 5 and is in turn driven through bevel gearing 40 and 41, Fig. 2, by the shaft 61, Fig. 1, driven by the steering motor SM of the trainer. The speed of the steering motor SM is proportional to the turning rate of the aircraft and is controlled by circuits of the trainer. To guide the chain 29, idler pulleys 42, Figs. 1 and 2, are rotatably mounted on the pivots 6 and 7 of the pantograph.

Thus, through the operation of the motor ASM, the driving head 14 is advanced over the surface of the table 24 at a speed proportional to the indicated airspeed and is oriented to determine the direction of its movement under the control of motor SM, and, because of the pantographic construction, the scanning units 530 and 531 are moved proportionately over the elements 534 and 535 representing the field of the airway system.

The cord 550 driven by the motor WDM moves the elements 534 and 535 in their guides 36 and 37 to introduce the effects of wind drift on the radio signals. Pulley 43 is driven by worm gearing 549 from motor WDM and drives the cord 550 around idlers 44, 45, and 46 supported from table 24. The magnitude of wind drift is proportional to the speed of the motor WDM. The direction of wind drift is determined by the orientation of elements 534 and 535 which may be angularly adjusted by suitable means (not shown) for this purpose on their supports in guides 36 and 37 respectively.

As is well known, there are commonly two transmitting channels at an airway radio range station. One of these is the "A" channel whereby coded signals are directionally transmitted into one pair of substantially opposite quadrants, and the other is the "N" channel whereby coded signals are directionally transmitted into a second pair of opposite quadrants. The field strength distribution of the signal in each quadrant is such that the intensity is a maximum along the axis of the quadrant, fading off on either side and also decreasing in intensity with distance from the station. It builds up rapidly as the station is approached, the rate of build-up increasing to a surge near the center of the station and then decreasing suddenly to zero to form a cone of silence over the station.

The variation in signal strength for one of the above described channels is illustrated by Fig. 3 wherein the high areas of the plate element 535 for example, represent the regions of maximum signal intensity, and the low areas the region where the signal strength is a minimum. It is possible therefore, to represent the field strength distribution of each channel of a radio range station by a variably contoured plate, the change in contouring being the parameter which represents the change in field strength. In many range stations the quadrants of a channel are symmetrical and diametrically opposed. In other stations the quadrants are dissimilar and subtend an angle other than 180 degrees. Either type of station may be represented by an appropriately contoured plate. Also in some stations the two channels each subtend an angle of arc such that only two on-course legs are formed. In any case, contoured plates may be used as hereinafter described to provide an automatic control of the radio range signals in training apparatus.

Referring to Figs. 1 and 2, the pantograph 15' is operated by the ASM and SM motors, as above described, and includes the scanning elements 530 and 531. These elements are mounted on opposite sides of the support 64 so as to move with the charting device 14, Fig. 1. Accordingly, as the charting device 14 moves in response to the usual aircraft controls so as to represent the instant position of the simulated flight, the scanning elements move along similar paths with respect to the contoured elements 534 and 535. Specifically, each scanning element comprises a pair of coils arranged for variable coupling as the element scans a contoured surface composed of a magnetic material such as iron.

In Fig. 4 there is illustrated one form of amplifier and signal coding unit 548 which may be used in combination with the scanning coils to provide suitably attenuated and interrupted signals from the oscillator 543 to the pilot's headphone receiver 538. The control grids of the thermionic tubes 540 and 542 are connected by conductors 649 and 650 respectively to the scanning coils. The oscillator has a common terminal connection with the coils 655 and 656, its other terminal being connected by conductor 557 to the coding unit 548 which in turn is connected to the coils 651 and 652 by conductors 555 and 556 respectively. Accordingly, current from the oscillator 543 is transmitted after proper coding by the unit 548 to the coils 651 and 652 in channels N and A respectively. The coil 651 is coupled to coil 655 by the iron core 653 to constitute one scanning element, and likewise the coil 652 is coupled to coil 656 by the iron core 654 to constitute the other scanning element. The cores 653 and 654 are constructed so that when in proximity to a magnetically permeable material the mutual coupling between the coils increases. Hence, when the pickup coils with cores 653 and 654 are mounted on the pantograph 15', Figs. 1 and 2, and are caused to traverse at a constant elevation the contoured iron surface 672, Fig. 3, the change in signal strength at the headset receiver 538 will be determined by the contour of the iron plate surface 672. By providing two contoured plate surfaces 672 and 673, one for each channel, and contouring each to such shape that when the scanning device 530 or 531 is moved from any one point in the scanning plane above the plate to another point, the change in coupling, which in turn produces a change in the inductance of that part of the circuit, will vary the strength of the signal in the associated channel by the same relative amount as would occur when moving between the same corresponding two points on the radio range being simulated.

It will be understood that the arrangement of coils and contoured plates shown in Figs. 1 and 2 is merely illustrative and that this construction may be modified in various ways. For example, the scanning coils may be fixed and the plates moved instead by the pantograph 15′, or the pantograph may be eliminated and either the scanning or scanned elements may be driven directly by a course charting device, such as the Link recorder cited, referring to U. S. Patent No. 2,179,663.

Fig. 5 illustrates how my invention may be used to introduce fan markers in a similar manner. In this arrangement, separate scanning coils which are supplementary to the "A" and "N" channel coils are operated from duplicating members of the pantograph. In the interest of simplicity a single pick-up element 530′ is shown operated from the main pantograph arms 1 and 2 by auxiliary links 18′ and 19′ so as to duplicate on a larger scale the motion of range scanning coil element 530. Fan marker positions on different beams are represented by magnetic material, such as iron pieces $F_1$, $F_2$, $F_3$ and $F_4$ shaped and contoured to represent typical fan marker signal fields. Accordingly, when the supplementary scanning coils are operated to the appropriate position, audible and/or visual fan markers signals may be surged in and out by corresponding variations in the parameter of the scanned element at the locations where markers are to occur. It will be apparent that the supplementary scanning coils can be used to bring in the fan marker signals by means of a circuit such as shown by Fig. 4 and in general by the same manner except that two separate channels are not required. The audio oscillator will of course operate at a higher pitch, such as 3000 cycles, to simulate the usual fan marker signal tone.

In the embodiment of the invention disclosed, audio-frequency electrical circuits are employed and the circuits each provide a conservative electrical system or network; in contradistinction to the employment of relatively high frequencies in an electrical system wherein relatively substantial radiation or dissipation of energy takes place.

Having thus described my invention with particularity with reference to a preferred form, it will be obvious to those skilled in the art after understanding my invention that various changes and modifications may be made therein without departing from the spirit and scope of my invention, and I aim in the appended claims to cover such changes and modifications as are within the scope of the invention.

What is claimed is:

1. In aircraft training apparatus, a charting device adapted to be operated by a pupil with respect to a position representing a radio range station, a source of signals representing those of a radio range, a receiver therefor, and means for modulating the signals comprising a coil movable in accordance with change in position of said charting device and a surface composed of a magnetically permeable material and having a contour such that the traversement of the coil over the surface causes a variation in magnetic flux through the coil in the same manner as the signal field strength at the simulated radio range changes.

2. In aircraft training apparatus, a flight-path charting device adapted to be operated by a pupil with respect to a position representing a radio range station, a source of signals representing those of a radio range, a receiver therefor, and signal modulating means including a coil movable in accordance with change in position of said charting device and means composed of a magnetically permeable material spatially related to said coil and arranged so that movement of the coil over said material varies the permeance of the coil flux path according to the field strength of a simulated radio range so as to cause variation in the coil magnetic flux in the same manner as the field strength of the simulated radio range changes.

3. The combination with an aviation ground trainer for simulating the flight of an aircraft, of a position charting device movable in response to operation of the training device by a student, means having a contoured surface of a magnetically permeable material for representing the field strength distribution of a radio range over which said device is movable, a source of signals representing those of a radio range and a receiver therefor, and a coil movable with respect to said contoured surface in accordance with movement of said device for causing variation of the inductance of said coil whereby the intensity of the signal current is varied and the signals modulated accordingly.

4. The combination with an aviation ground trainer for simulating the flight of an aircraft, of a position charting device movable in response to operation of the training device by a student, means defining a non-planar surface composed of a magnetically permeable material for representing the field strength distribution of a radio range over which said device is movable, a source of signals representing those of a radio range and a receiver therefor, and a pair of coupled coils movable as a unit with respect to said permeable material for causing variation of the coil coupling whereby the intensity of the signal current is varied and the signals modulated accordingly.

5. In aircraft training apparatus, a flight-path charting device adapted to be operated by a pupil over a surface representing a radio range, and means for simulating marker signals or the like comprising magnetic material shaped to represent a marker field pattern and located at said surface to correspond to marker signal positions, a source of signals representing those of a marker, a receiver therefor, and coil structure movable with said charting deviec in scanning relation to said magnetic material so as to cause variation in magnetic flux through the coil for modulating the signals in the same manner as the marker field strength changes.

RICHARD CARL DEHMEL.

REFERENCES CITED

The following references are of record in the file of this patent:

UNITED STATES PATENTS

| Number | Name | Date |
|---|---|---|
| 2,226,726 | Kramer | Dec. 31, 1940 |
| 2,321,799 | Cone | June 15, 1943 |
| 2,326,764 | Crane | Aug. 17, 1943 |
| 2,389,359 | Crow | Nov. 20, 1945 |